(12) United States Patent
Okandan

(10) Patent No.: US 10,914,848 B1
(45) Date of Patent: Feb. 9, 2021

(54) FABRICATION, INTEGRATION AND OPERATION OF MULTI-FUNCTION RADIATION DETECTION SYSTEMS

(71) Applicant: mPower Technology, Inc., Albuquerque, NM (US)

(72) Inventor: Murat Okandan, Edgewood, NM (US)

(73) Assignee: mPower Technology, Inc., Albuquerque, NM (US)

( * ) Notice: Subject to any disclaimer, the term of this patent is extended or adjusted under 35 U.S.C. 154(b) by 0 days.

(21) Appl. No.: 16/512,298

(22) Filed: Jul. 15, 2019

Related U.S. Application Data

(60) Provisional application No. 62/697,766, filed on Jul. 13, 2018.

(51) Int. Cl.
  *G01T 1/02* (2006.01)
  *G01T 1/24* (2006.01)
  *G01T 1/29* (2006.01)
  *G01N 23/223* (2006.01)

(52) U.S. Cl.
  CPC ............ *G01T 1/24* (2013.01); *G01N 23/223* (2013.01); *G01T 1/2928* (2013.01)

(58) Field of Classification Search
  CPC ........ G01T 1/24; G01T 1/2928; G01N 23/223
  See application file for complete search history.

(56) References Cited

U.S. PATENT DOCUMENTS

| | | | |
|---|---|---|---|
| 4,089,705 A | 5/1978 | Rubin | |
| 4,633,031 A | 12/1986 | Todorof | |
| 4,805,006 A | 2/1989 | Yamaguchi et al. | |
| 5,374,935 A | 12/1994 | Forrest | |
| 5,407,491 A | 4/1995 | Freundlich et al. | |
| 5,444,249 A | 8/1995 | Wong | |
| 5,457,322 A | 10/1995 | Kitaguchi et al. | |
| 5,730,808 A | 3/1998 | Yang et al. | |
| 5,733,382 A | 3/1998 | Hanoka | |

(Continued)

FOREIGN PATENT DOCUMENTS

| | | |
|---|---|---|
| CN | 102044580 | 5/2011 |
| CN | 102097541 | 6/2011 |

(Continued)

OTHER PUBLICATIONS

"Industry-Specific Laser MicroJet Benefits", https://www.synova.ch/applications/semiconductors-photoviltaics.html, Apr. 23, 2017.

(Continued)

*Primary Examiner* — Kiho Kim
(74) *Attorney, Agent, or Firm* — Peacock Law P.C.; Philip D. Askenazy

(57) ABSTRACT

Radiation detectors and methods of use thereof that produce more accurate results. A region of the radiation detector is covered by a conversion layer. A reference region is covered by a light barrier material such as a metal, and not the conversion layer. The reference region incurs less radiation damage than the region under the conversion layer. The dark current produced by the reference region can be used to more accurately calibrate the detector, provide real time normalization of the current produced by the conversion layer region, and determine when the detector has been damaged sufficiently to be replaced.

19 Claims, 9 Drawing Sheets

(56) References Cited

U.S. PATENT DOCUMENTS

| | | |
|---|---|---|
| 6,490,477 B1 | 12/2002 | Zylka et al. |
| 6,909,098 B2 | 6/2005 | Bross et al. |
| 7,567,649 B1 | 7/2009 | Safai et al. |
| 8,879,688 B2 | 11/2014 | Safai |
| 8,994,137 B2 | 3/2015 | Padinger |
| 9,116,249 B1 | 8/2015 | Claus et al. |
| 9,141,413 B1 | 9/2015 | Cruz-Campa et al. |
| 9,511,393 B2 | 12/2016 | Safai |
| 9,559,229 B2 | 1/2017 | Chen |
| 2003/0155516 A1 | 8/2003 | Spartiotis et al. |
| 2003/0173523 A1 | 9/2003 | Vuorela |
| 2009/0071528 A1 | 3/2009 | Chen |
| 2009/0288702 A1 | 11/2009 | Kim |
| 2010/0282293 A1 | 11/2010 | Meyer et al. |
| 2010/0283612 A1 | 11/2010 | Wong et al. |
| 2010/0327171 A1 | 12/2010 | Robinson et al. |
| 2011/0005570 A1 | 1/2011 | Jain |
| 2011/0277835 A1 | 11/2011 | Masson et al. |
| 2011/0290296 A1 | 12/2011 | Daniel et al. |
| 2012/0000502 A1 | 1/2012 | Wiedeman et al. |
| 2012/0145231 A1 | 6/2012 | Woods et al. |
| 2012/0265975 A1 | 10/2012 | Kimelman |
| 2013/0048861 A1 | 2/2013 | Oyhta et al. |
| 2013/0161772 A1 | 6/2013 | Chan et al. |
| 2013/0206219 A1 | 8/2013 | Kurtin et al. |
| 2013/0213462 A1 | 8/2013 | Lewis et al. |
| 2013/0264669 A1 | 10/2013 | Li et al. |
| 2013/0269747 A1 | 10/2013 | Lentine et al. |
| 2013/0314236 A1 | 11/2013 | Warren |
| 2013/0344645 A1 | 12/2013 | Ahmari et al. |
| 2014/0060616 A1 | 3/2014 | Okandan et al. |
| 2014/0102531 A1 | 4/2014 | Moslehi |
| 2014/0203392 A1 | 7/2014 | Li et al. |
| 2014/0266289 A1 | 9/2014 | Della Sera et al. |
| 2014/0334601 A1 | 11/2014 | Shizukuishi |
| 2015/0114444 A1 | 4/2015 | Lentine et al. |
| 2015/0114451 A1 | 4/2015 | Anderson et al. |
| 2015/0280025 A1 | 10/2015 | Bellanger et al. |
| 2015/0280641 A1 | 10/2015 | Garg et al. |
| 2015/0311371 A1 | 10/2015 | Krishnamoorthy |
| 2015/0349176 A1 | 12/2015 | Morad et al. |
| 2015/0349703 A1 | 12/2015 | Morad et al. |
| 2016/0015350 A1 | 1/2016 | Chang |
| 2016/0268455 A1 | 9/2016 | Levy et al. |
| 2016/0284749 A1* | 9/2016 | Kurokawa ........ H01L 27/14676 |
| 2016/0359637 A1 | 12/2016 | Okandan |
| 2016/0380143 A1 | 12/2016 | Hekmatshoartabari et al. |
| 2017/0200762 A1 | 7/2017 | Okandan et al. |
| 2017/0358041 A1 | 12/2017 | Forbes, Jr. et al. |
| 2018/0166598 A1 | 6/2018 | Okandan et al. |

FOREIGN PATENT DOCUMENTS

| | | |
|---|---|---|
| CN | 102157622 | 8/2011 |
| CN | 105023921 | 11/2015 |
| EP | 0109176 | 5/1984 |
| EP | 1770791 | 4/2007 |
| KR | 2010043654 | 4/2010 |
| WO | 2009033215 | 3/2009 |

OTHER PUBLICATIONS

"Stealth Dicing Technology and Applications", https:/www.hamamatsu.com/resources/pdf/etd/SD_tech_TLAS9004E.pdf, Mar. 2005.

Bollier, David , "The Blockchain: a Promising New Infrastructure for Online Commons", http://bollier.org/blog/blockchain-promising-new-infrastructure-online-commons, Mar. 4, 2015, 1-2.

Kerr, M. J., et al., "Surface recombination velocity of phosphorus-diffused silicon solar cell emitters passivated with plasma enchanced chemical vapor deposited silicon nitride and thermal silicon oxide", Journal of Applied Physics, vol. 89, No. 7, American Institute of Physics, Apr. 1, 2001, 3820-3826.

Kim, Ho Kyung, et al., "Cascade Modeling of Pixelated Scintillator Detectors for X-Ray Imaging", IEEE Transactions on Nuclear Science, vol. 55, No. 3, Jun. 2008, 1367-1366.

Lentine, Anthony L., et al., "Optimal Cell Connections for Improved Shading, Reliability, and Spectral Performance of Microsystem Enabled Photovolutaic (MEPV) Modules", Presented at 35th IEEE PVSC Conference, Jun. 20-25, 2010.

Nikolic, Rebecca J., et al., "Fabrication of Pillar-Structured Thermal Neutron Detectors", 2007 IEEE Nuclear Science Symposium Conference Record, 2007, 1577-1580.

Shen, C. C., et al., "Two-terminal Monolithic InP/InGaAsP Tandem Solar Cells with Tunneling Intercell Ohmic Connections", Conference Record of the Twenty Second IEEE Photovoltaic Specialists Conference, Oct. 7, 1991, 381-387.

\* cited by examiner

FABRICATION, INTEGRATION AND OPERATION OF MULTI-FUNCTION RADIATION DETECTION SYSTEMS

CROSS-REFERENCE TO RELATED APPLICATIONS

This application claims priority to and the benefit of the filing of U.S. Provisional Patent Application No. 62/697,766, filed on Jul. 13, 2018, the specification and claims of which is incorporated herein by reference.

BACKGROUND OF THE INVENTION

Field of the Invention (Technical Field)

The present invention is related to fabrication, assembly, feature integration and operation of low cost, high performance radiation detectors based on thin, singulated, multi-function semiconductor devices and necessary functionalization materials.

Background Art

Note that the following discussion may refer to a number of publications and references. Discussion of such publications herein is given for more complete background of the scientific principles and is not to be construed as an admission that such publications are prior art for patentability determination purposes.

Radiation detection is a critical function for a very large variety of applications, including in areas such as biomedical, homeland defense, military, environmental monitoring, disaster response, natural resource mapping, and many others. Legacy radiation detectors have relied on very well-established methods and instruments for detection of high energy photons (gamma, x-ray) and particles (neutrons, protons, electrons, heavy and light nuclei), mostly relying on scintillation or direct detection of particles. In scintillation, incoming radiation interacts with a material which then produces an output (mostly photons, or electrons in certain cases) which are then detected by a solid-state or photo-multiplier light detector. In other instances, radiation interacts directly with the detector material, producing electrons and holes within the detector material, which are then collected by the detector to produce the signal. Almost all of these systems are bulky, require integration and careful handling of fragile and/or hazardous materials; some systems also require cryogenic cooling to achieve the desired functionality.

SUMMARY OF THE INVENTION (DISCLOSURE OF THE INVENTION)

An embodiment of the present invention is a radiation detector comprising a first region of a silicon detector disposed covered by a conversion layer; and a second region of the silicon detector covered by a light barrier and not the conversion layer. The second region is preferably located along the outer edge of the silicon detector. The second region preferably extends between approximately 1 and 10 microns from the edges of the silicon detector. The light barrier preferably comprises a metal and preferably blocks photons having an energy approximately below that of soft x-rays. The detector optionally comprises a third region of the silicon detector not covered by either the conversion layer or the light barrier. The third region is preferably between the first region and the second region.

Another embodiment of the present invention is a method for measuring current produced by a radiation detector, the method comprising determining which detector pixels in a first region of a silicon detector covered by a conversion layer are non-faulty detector pixels; measuring a current produced by detector pixels in a second region of the silicon detector beneath a light barrier but not beneath the conversion layer; averaging the current to a per-detector-pixel value; and subtracting the value from a current produced by each non-faulty detector pixel in the first region. The determining step preferably comprises placing the radiation detector in a shielded environment; measuring dark current produced by detector pixels in the second region; averaging the dark current to a per-detector-pixel dark current value; subtracting the dark current value from the dark current produced by each detector pixel in the first region to produce a calibration dark current value; and labeling each detector pixel in the first region that has a calibration dark current value of approximately zero as a non-faulty detector pixel. The method optionally further comprises placing the radiation detector in a shielded environment after the radiation detector has been in normal use for a period of time; measuring dark current produced by detector pixels in the second region; averaging the dark current to a per-detector-pixel dark current value; subtracting the dark current value from the dark current produced by each detector pixel in the first region to produce a final dark current value; determining the number of detector pixels in the first region that each have a dark current value of approximately zero; and replacing the radiation detector when the number of non-faulty detector pixels in the first region is a predetermined number less than the number of non-faulty detector pixels measured in the determining step. Alternatively, the method optionally further comprises placing the radiation detector in a shielded environment after the radiation detector has been in normal use for a period of time; measuring dark current produced by the detector pixels in the first region; and replacing the radiation detector when the dark current is greater by a predetermined amount than a dark current produced by the detector pixels in the first region measured during the determining step. Alternatively, the method optionally further comprises placing the radiation detector in a shielded environment after the radiation detector has been in normal use for a period of time; measuring dark current produced by detector pixels in the second region; averaging the dark current to a per-detector-pixel dark current value; subtracting the dark current value from the dark current produced by each detector pixel in the first region to produce a final dark current value; and replacing the radiation detector when the final dark current value is greater by a predetermined amount than the calibration dark current value. The second region is preferably located along the outer edge of the silicon detector. The second region preferably extends between approximately 1 and 10 microns from the edges of the silicon detector. The light barrier preferably comprises a metal. The light barrier preferably blocks photons having an energy approximately below that of soft x-rays. The radiation detector optionally further comprises a third region of the silicon detector not covered by either the conversion layer or the light barrier. The third region is preferably between the first region and the second region. Dark current produced by detector pixels in the third region is preferably used to determine a total radiation dose measured by the radiation detector.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate the practice of embodiments of the present invention and, together with the description, serve to explain the principles of the invention. The drawings are only for the purpose of illustrating certain embodiments of the invention and are not to be construed as limiting the invention. In the figures.

DETAILED DESCRIPTION OF EMBODIMENTS OF THE INVENTION

Figure 1:
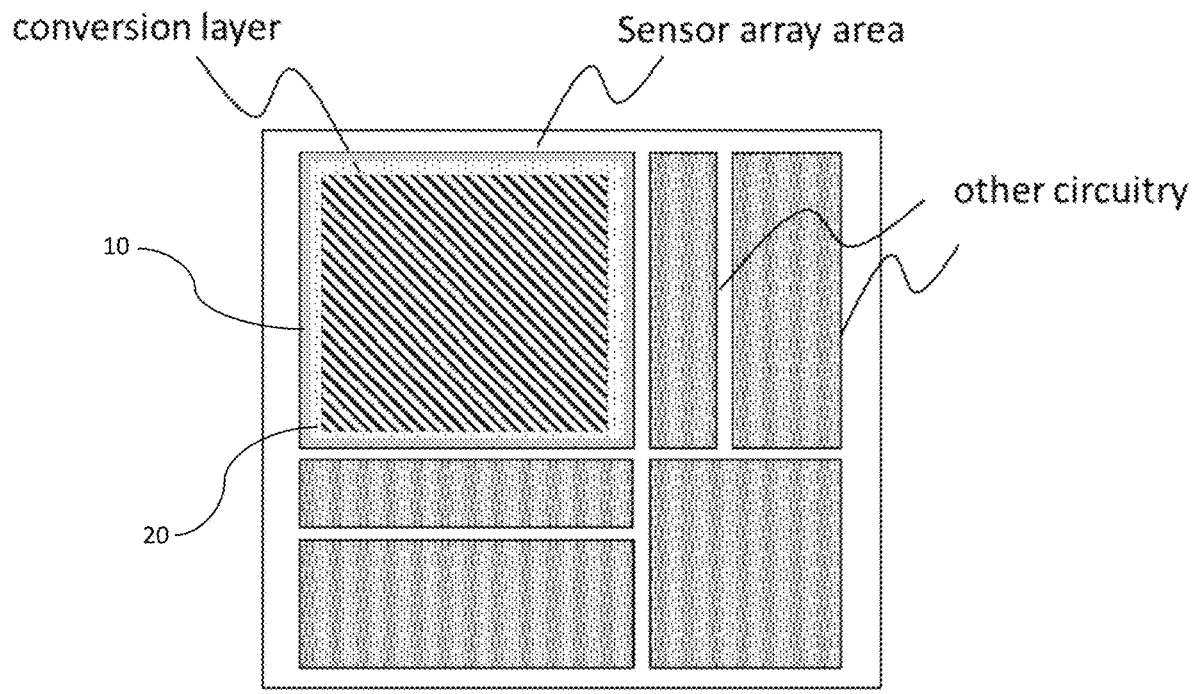
FIG. 1 shows a detector array with conversion layer placed substantially within the sensor array area and away from the signal detection, processing, system control and communication circuitry.

FIG. 1 is a schematic representation of a detector that has been manufactured using semiconductor processing techniques typically used in the microelectronics and solar industries. The sensor area comprises light sensitive pixels which function by collecting electrons (or holes) that are generated by incident light. In case of radiation sensing, the incoming radiation generates energetic electrons (in case of gamma, X-ray, neutrons) or other particles (photons, alpha particles, electrons) that then enter the semiconductor device, which preferably comprises silicon. These particles interact further with the silicon and generate more electron-hole pairs that are then collected by the sensor pixels. Energetic particles generate more than one electron-hole pair; in contrast, visible light interacting with silicon generates only one electron-hole pair per photon. The conversion layer is preferably located substantially inside the pixel array area to prevent energetic electrons from interacting with other processing and communication circuitry and causing unwanted operations and interference.

Figure 2:
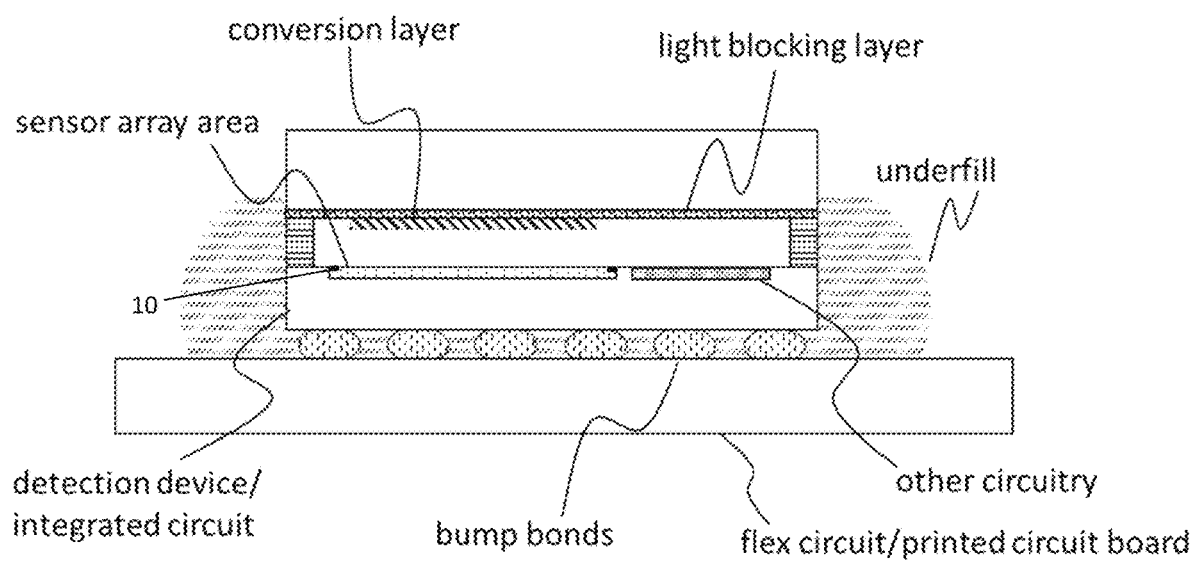
FIG. 2 shows a cross section of the sensor with cover layers attached that contain conversion layers deposited and/or integrated in them.

FIG. 2 is a cross-section of an embodiment of the sensor. The light blocking layer is preferably deposited on or otherwise attached to the inside of the cap layer. The cap layer itself can also be light blocking. The conversion layer may be deposited on or otherwise attached to the cap layer or is alternatively formed within the cap layer. An underfill layer is preferably used to provide additional mechanical support underneath the sensor chip. The sensor can be attached to a receiving layer such as a flex circuit or printed circuit board with bump bonds or with wire-bonding methods. The underfill layer can extend around the sensor edges to provide further light blocking functionality if necessary.

Figure 3:
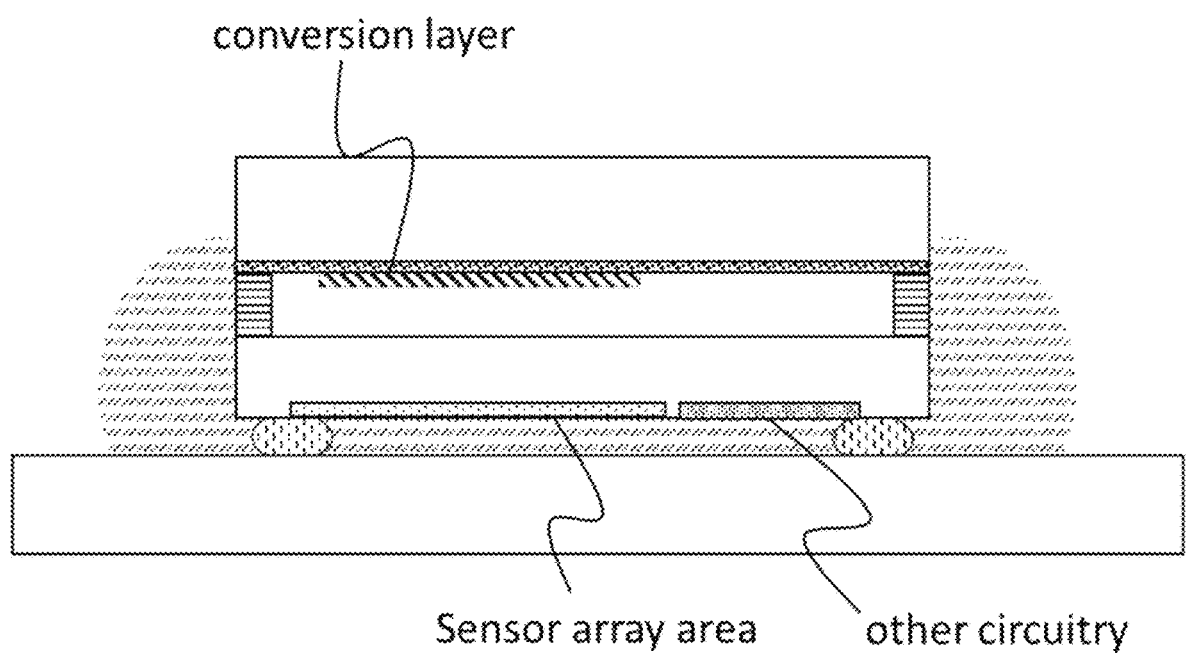
FIG. 3 shows a cross section of the sensor where the detector elements and circuitry are placed in a flip-chip configuration.

FIG. 3 shows a configuration of the sensor where the semiconductor chip is assembled in flip-chip configuration, with the sensor array pixels and other circuitry facing the receiving substrate. The cap layer can be assembled on this device before dicing or after dicing of the individual sensor chips.

Figure 4:
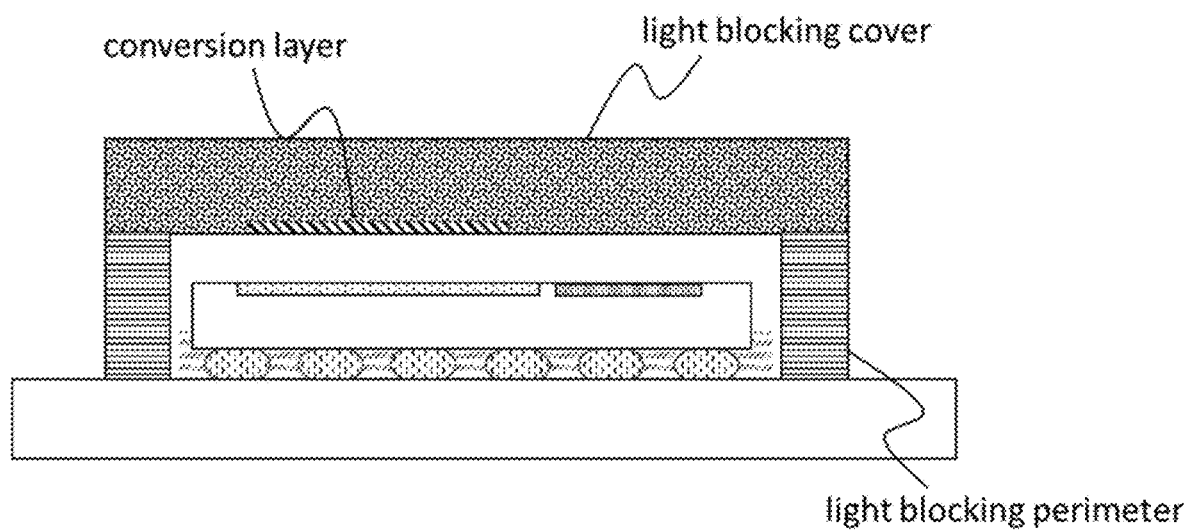
FIG. 4 shows a cross section of the sensor where a conversion layer is embedded in a light-tight material that forms the cover layer.

FIG. 4 shows an embodiment where the conversion layer is formed in or assembled into a cap layer that is light blocking. Edge sections could be formed separately as a frame or could be formed as a part of the cap layer and attached to the sensor chip.

Figure 5:
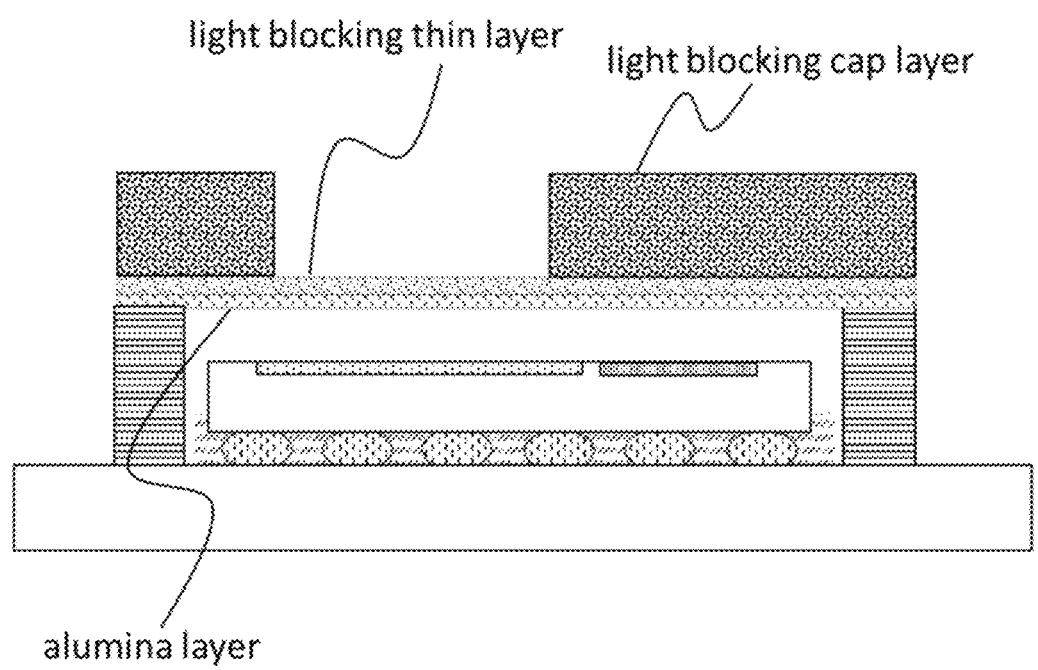
FIG. 5 shows a cross section of the sensor where a thin light blocking layer is integrated into the cover layer.

FIG. 5 shows an embodiment where incident particles such as alpha and/or beta particles are detected without being converted into other particles through a conversion layer. The thin layer may comprise polymeric, ceramic (glass) or other material that does not completely stop the incoming radiation particle. The cap layer is preferably thicker in other regions to provide mechanical support and prevent unwanted operation of the sensor due to interactions with the incoming particles.

Figure 6:
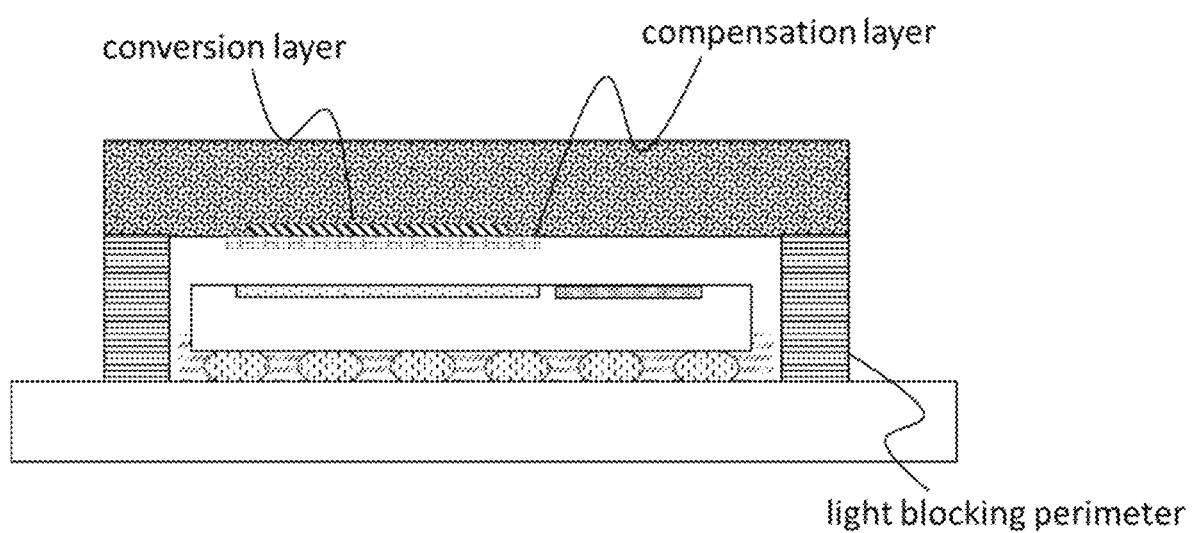
FIG. 6 shows a cross section of the sensor where a compensation layer is deposited or attached on the conversion layer to modify generated particles.

FIG. 6 shows an embodiment where an additional compensation layer is deposited or otherwise located on the conversion layer to modify the energy, direction and/or other characteristics of the particles generated in the conversion layer. Additional layers can also be placed in front of or around the edges of the conversion layer to modify incoming radiation.

Figure 7:
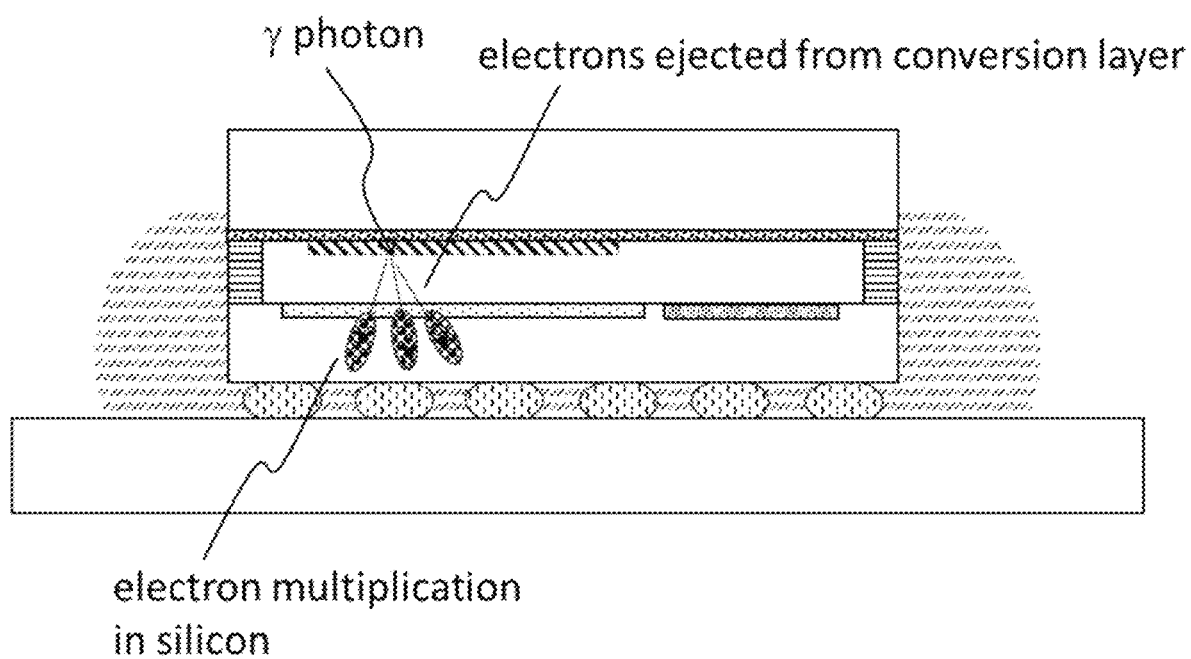
FIG. 7 shows a gamma photon interacting with the conversion layer, generating energetic electrons that are ejected from the conversion layer and enter the silicon generating more electrons (electron multiplication), which are then collected and processed by the pixels and circuitry in the sensor.

FIG. 7 shows an interaction of the incoming radiation (in this case a gamma photon) with the conversion layer (for example copper), generating energetic electrons that then enter the silicon and generate further electron-hole pairs that are then collected by the sensor pixels and processed by the signal processing circuitry.

Figure 8:
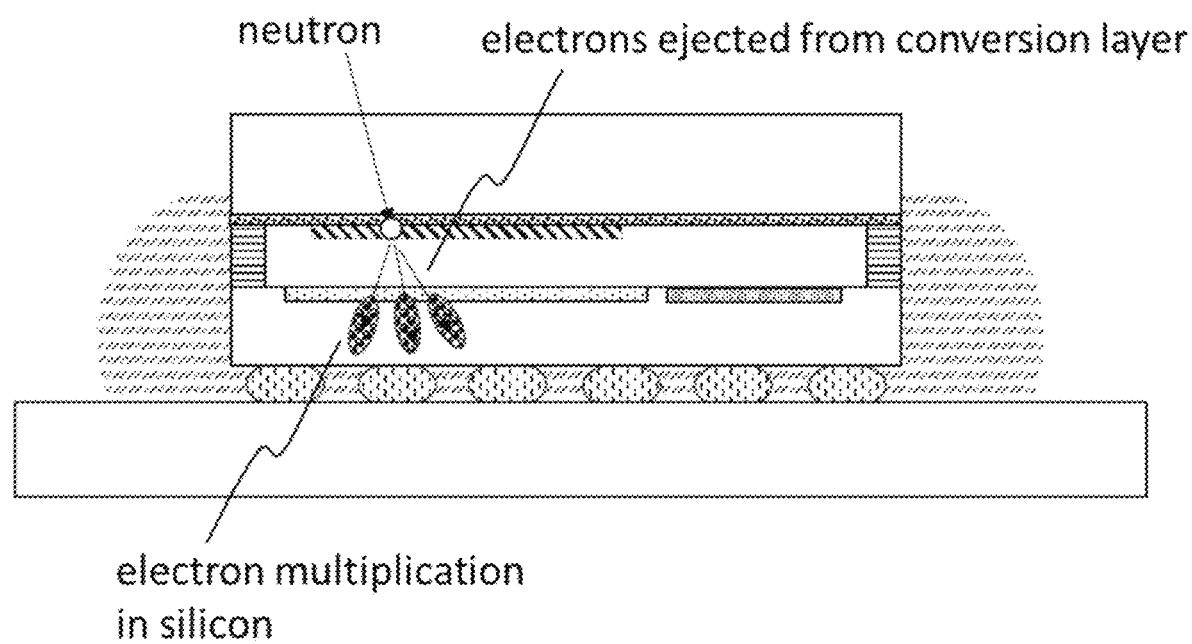
FIG. 8 shows a neutron being detected by the sensor.

FIG. 8. shows an interaction of the incoming neutron with the conversion layer (for example gadolinium oxide nanoparticles) which generates energetic electrons that are then detected by the silicon detector.

Figure 9:
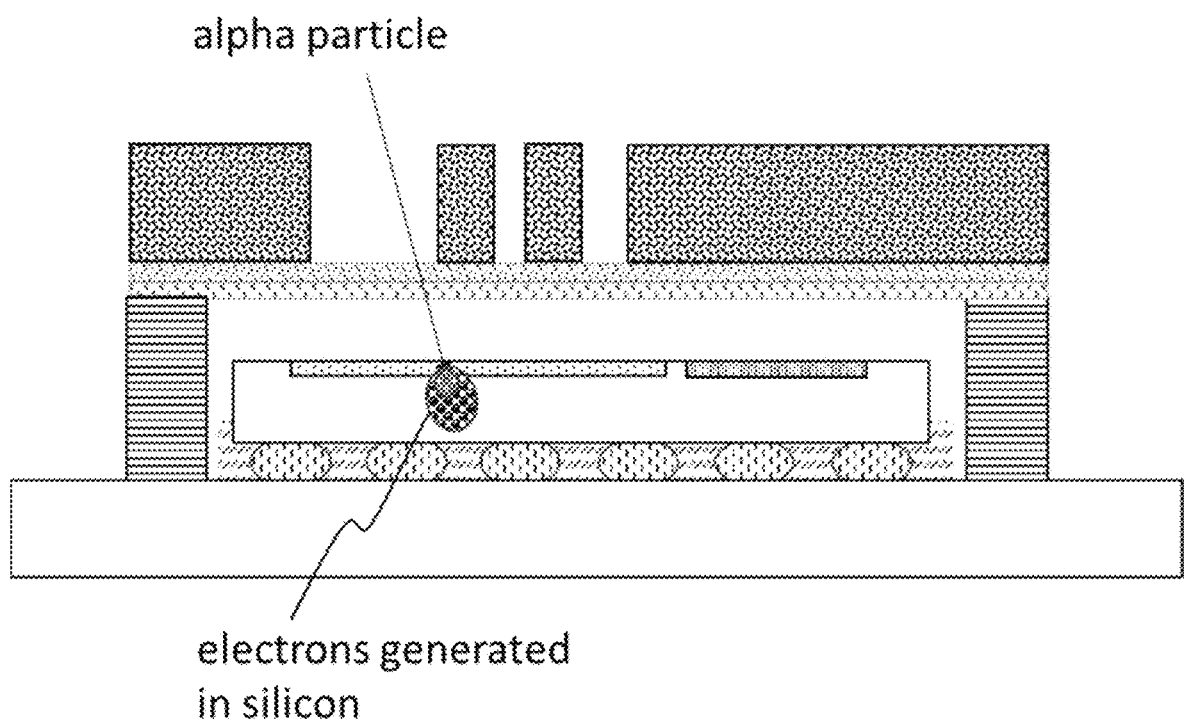
FIG. 9 shows an alpha particle being detected by the sensor.

FIG. 9. shows an incoming alpha particle that moves through the thin light-tight conversion layer and then enters the silicon and generates electron-hole pairs that are detected by the sensor.

By utilizing silicon based detectors, large economies of scale benefits are captured. In devices of the present invention, the semiconductor device detecting radiation may be comprised of individual solar cells that are coupled to processing electronics, or alternatively be comprised of devices that are monolithically integrated with detection and signal processing circuitry on the same semiconductor chip. In case of a monolithically integrated sensor, similar to a conventional CMOS imaging chip, substantially all of the signal detection and processing circuitry preferably resides on the same semiconductor chip, which reduces unwanted noise and reduces part count, simplifying product integration. In some embodiments the charge detection circuitry of a camera chip (which normally detects electron-hole pairs that are generated by incident light) is used for detecting electron-hole pairs that are generated by energetic particles (electrons, soft-X ray photons, UV, visible and/or IR photons, protons, alpha particles, etc.) that are either directly incident on the detector or that are generated in a conversion layer and that are then incident on the detector. In contrast with other detectors where the conversion and carrier collection happens in a separate layer (for example, CZT or GaAs, etc.), in this sensor the interaction of conversion products and resulting electron-hole pairs are preferably located in the same semiconductor (such as silicon). Other detectors capture light that is generated in a scintillator that is in close proximity, or collect electrons on a surface electrode, whereas in this device the energetic particles interact with the semiconductor directly and carriers (electron-hole pairs) are preferably collected in the same semiconductor.

In one or more embodiments, the sensor chip is manufactured in the same way a CMOS camera chip is manufactured up to the addition of a transparent cover layer. However, instead of a light transparent cover layer, a light blocking layer is preferably deposited on the cover, or a light blocking material is used to form the bulk of the cover layer. This light blocking layer and other light blocking elements around the sensor prevent unwanted signals from being generated due to ambient light. A conversion layer is preferably deposited on the surface that is facing the sensor, which converts the radiation of interest (gamma rays, X-rays, neutrons, alpha particles, beta particles, etc.) into a stream of particles (energetic electrons) and/or photons that are readily absorbed in silicon, generating a large number of electron-hole pairs which are then collected and processed as the signal.

For alpha and beta radiation, it is also possible to perform the desired detection without a conversion layer, but in those cases a thin light blocking layer is preferably used to prevent unwanted signal generation due to ambient light. Such a thin layer can be formed by deposition of a thin (for example 1 um) aluminum or other metal layer on thin (for example 5-50 um) polyimide, mylar, parylene or another suitable polymeric layer. A thin (preferably 0.001 to 0.1 um) alumina ($Al_2O_3$) layer is also preferably deposited, preferably by the atomic layer deposition (ALD) process, which helps prevent oxygen diffusion through the stack. For neutron detection, the conversion layer preferably comprises gadolinium containing compounds (for example, gadolinium oxide nanoparticles), or lithium-7 or boron-10 containing layers or compounds. For gamma detection, a metal layer (for example, copper, tungsten, gold, etc.) is used to generate energetic electrons and soft X-rays that are then detected in the silicon. Additional layers of metal or other materials can also be used to filter certain energy ranges of incoming radiation or to perform energy compensation as desired. The gap between the conversion layer and the silicon detector is preferably either kept at vacuum which prevents the conversion products from interacting with any other materials before entering the silicon detector, or alternatively filled with a gas such as xenon or neon that readily interacts with the conversion products (for example, energetic electrons) and generates additional photons that are then detected by the silicon detector.

As shown in FIGS. 1-2, in at least one embodiment of the present invention the conversion layer is preferably patterned to coincide with a portion of the light detection region (labeled in the figures as the sensor array area) of a CMOS camera, which comprises an array of individual sensors or pixels. The conversion layer is preferably inset a certain distance (preferably 1-10 um) from the edges of the array. This minimizes the potential interaction of conversion products with the detection and signal detection circuitry, which is usually located in the periphery of the sensor, which interaction could cause unwanted operational behavior in the sensor. Furthermore, not covering the entire light sensor with a conversion layer enables a reference region of the sensor array area, in this case the edge, to be covered only by light barrier 10, which preferably comprises metal preferably integrated into the CMOS layer, as well as an optional intermediate region 20 that is not covered by either the conversion layer or barrier 10. Although the entire light sensor is preferably disposed under the light blocking layer described above, light barrier 10, unlike the light blocking layer, can prevent visible photons (and preferably all photons having an energy below approximately that of soft x-rays) and low energy electrons generated by the conversion layer from impinging upon the reference region of the detector. Also, since the reference region isn't covered by the conversion layer, it is not subject to conversion products either. The reference regions are preferably located along the edge or periphery of the sensor, but can alternatively be located anywhere.

The reference region and intermediate region 20 can not only be used for temperature compensation of the dark current produced by the sensor but also can be used to set the black level of the sensor and determine when the sensor needs to be replaced due to excessive radiation damage. Because of light barrier 10 and the lack of an overlaying conversion layer, the reference region produces only a small amount of noise from radiation, which is acceptable in this application. Unlike the silicon layer in the sensor area below the conversion layer, which accumulates damage due to energetic particle interactions in silicon, the reference region and intermediate region 20 do not see such damage and can thus provide a more accurate measure of the total dose of radiation seen by the detector.

In an initial calibration sequence, all pixels in the active area beneath the conversion layer that produce a dark current above a certain threshold level are recorded as faulty (i.e. 'hot or 'warm') pixels, and signals from those pixels are excluded from normal running mode measurements to improve the accuracy of the measurement. The threshold level is preferably determined by a per-pixel (or per-group of pixels, for example per-column or per row) average of the dark current produced by the reference region. During regular operation, only the signals from non-faulty pixels are recorded and analyzed. The reference region is preferably used to determine a nominal dark current level for the current operating temperature and this signal level is used to calculate a 'black' signal level that is subtracted from all other active pixels. Thus, in normal operation, the current produced by each non-faulty pixel has its output reduced by the dark current produced by the reference device pixels (averaged per pixel by algorithms weighted by, for example, pixel location such as column wise or row wise weighting). A similar 'auto-black calibration' approach is used for CMOS optical sensors, but is novel for use in radiation detectors.

The detector under the conversion layer suffers damage due to the high energy electrons produced by radiation incident on the conversion layer, which increases the dark current produced in this area over that expected by temperature calibration. By using the reference region and the optional intermediate region, which are not damaged as much as the main region of the detector because they are not subject to conversion layer products, a more accurate dark current measurement during regular operation can be made. This function can also be performed by periodically recording the measured signal from the array in a non-volatile memory element and then correlated with the signal measured by comparing the reference devices and the devices in the radiation detection region. The accumulated dose signal can be ascertained by looking at dark current increase in the pixels under the conversion layer; the detection of a a certain number of faulty pixels or a predetermined dark current increase relative to the signal produced by the pixels in the reference region and/or intermediate region in a low or zero radiation environment can be used to indicate a desired sensor replacement.

Silicon detectors are typically in either a front-illuminated or a back-illuminated (thinned) configuration. The desired cap layer can be attached in either configuration. In one embodiment, the silicon device is fully processed, singulated and attached to a carrier (for example, a rigid printed circuit board or a chip scale carrier), and the cap layer with the desired conversion layer and other layers is then assembled on the sensor. In another embodiment, the silicon device is fully processed, a cap layer (in wafer form) containing the desired conversion layer and other layers is attached to the wafer, and then the sensor devices are singulated and the final sensor is attached to a receiver (for example a flexible or rigid printed circuit board).

These detectors are preferably assembled in an array format which provides more information on the incoming radiation, such as energy ranges (spectroscopy), directionality, and timing between events. The additional processing to correlate the information from individual sensors is preferably accomplished by coordinating individual sensors and performing array level functions in additional circuitry that is included in the array or potentially in an external processing element. Such an array may comprise single types of sensors (for example, all gamma sensors) or a combination of different detectors (for example, gamma, neutron and alpha detectors) in various spatial patterns with other filter or compensation layers placed among the detectors.

Note that in the specification and claims, "about" or "approximately" means within twenty percent (20%) of the numerical amount cited. As used herein, the singular forms "a," "an," and "the" include plural referents unless the context clearly dictates otherwise. Thus, for example, reference to "a functional group" refers to one or more functional groups, and reference to "the method" includes reference to equivalent steps and methods that would be understood and appreciated by those skilled in the art, and so forth.

Although the invention has been described in detail with particular reference to the disclosed embodiments, other embodiments can achieve the same results. Variations and modifications of the present invention will be obvious to those skilled in the art and it is intended to cover all such modifications and equivalents. The entire disclosures of all patents and publications cited above are hereby incorporated by reference.

What is claimed is:

1. A radiation detector comprising:
   a first region of a silicon detector covered by a conversion layer; and
   a second region of the silicon detector covered by a light barrier and not the conversion layer.

2. The radiation detector of claim 1 wherein the second region is located along the outer edge of the silicon detector.

3. The radiation detector of claim 2 wherein the second region extends between approximately 1 and 10 microns from the edges of the silicon detector.

4. The radiation detector of claim 1 wherein the light barrier comprises a metal.

5. The radiation detector of claim 1 wherein the light barrier blocks photons having an energy approximately below that of soft x-rays.

6. The radiation detector of claim 1 further comprising a third region of the silicon detector not covered by either the conversion layer or the light barrier.

7. The radiation detector of claim 6 wherein the third region is between the first region and the second region.

8. A method for measuring current produced by a radiation detector, the method comprising:
   determining which detector pixels in a first region of a silicon detector covered by a conversion layer are non-faulty detector pixels;
   measuring a current produced by detector pixels in a second region of the silicon detector beneath a light barrier but not beneath the conversion layer;
   averaging the current to a per-detector-pixel value; and
   subtracting the value from a current produced by each non-faulty detector pixel in the first region.

9. The method of claim 8 wherein the determining step comprises:
   placing the radiation detector in a shielded environment;
   measuring dark current produced by detector pixels in the second region;
   averaging the dark current to a per-detector-pixel dark current value;
   subtracting the dark current value from the dark current produced by each detector pixel in the first region to produce a calibration dark current value; and
   labeling each detector pixel in the first region that has a calibration dark current value of approximately zero as a non-faulty detector pixel.

10. The method of claim 9 further comprising;
    placing the radiation detector in a shielded environment after the radiation detector has been in normal use for a period of time;
    measuring dark current produced by detector pixels in the second region;
    averaging the dark current to a per-detector-pixel dark current value;
    subtracting the dark current value from the dark current produced by each detector pixel in the first region to produce a final dark current value;
    determining the number of detector pixels in the first region that each have a dark current value of approximately zero; and
    replacing the radiation detector when the number of non-faulty detector pixels in the first region is a predetermined number less than the number of non-faulty detector pixels measured in the determining step.

11. The method of claim 9 further comprising:
    placing the radiation detector in a shielded environment after the radiation detector has been in normal use for a period of time;
    measuring dark current produced by the detector pixels in the first region; and
    replacing the radiation detector when the dark current is greater by a predetermined amount than a dark current produced by the detector pixels in the first region measured during the determining step.

12. The method of claim 9 further comprising;
placing the radiation detector in a shielded environment after the radiation detector has been in normal use for a period of time;
measuring dark current produced by detector pixels in the second region;
averaging the dark current to a per-detector-pixel dark current value;
subtracting the dark current value from the dark current produced by each detector pixel in the first region to produce a final dark current value; and
replacing the radiation detector when the final dark current value is greater by a predetermined amount than the calibration dark current value.

13. The method of claim 8 wherein the second region is located along the outer edge of the silicon detector.

14. The method of claim 13 wherein the second region extends between approximately 1 and 10 microns from the edges of the silicon detector.

15. The method of claim 8 wherein the light barrier comprises a metal.

16. The method of claim 8 wherein the light barrier blocks photons having an energy approximately below that of soft x-rays.

17. The method of claim 8 wherein the radiation detector further comprises a third region of the silicon detector not covered by either the conversion layer or the light barrier.

18. The method of claim 17 wherein the third region is between the first region and the second region.

19. The method of claim 17 wherein a dark current produced by detector pixels in the third region is used to determine a total radiation dose measured by the radiation detector.

* * * * *